United States Patent

Andrews

(10) Patent No.: US 6,335,752 B1
(45) Date of Patent: Jan. 1, 2002

(54) EXPOSURE PROFILES FROM LASER SOURCES HAVING FINITE RESPONSE TIMES

(75) Inventor: John R. Andrews, Fairport, NY (US)

(73) Assignee: Xerox Corporation, Stamford, CT (US)

(*) Notice: Subject to any disclaimer, the term of this patent is extended or adjusted under 35 U.S.C. 154(b) by 649 days.

(21) Appl. No.: 08/734,319

(22) Filed: Oct. 21, 1996

(51) Int. Cl.$^7$ ................................................ B41J 2/435
(52) U.S. Cl. ........................................ 347/249; 347/247
(58) Field of Search ................................ 347/134, 246, 347/247, 248, 234, 235, 236, 237, 249, 250, 132; 399/237; 358/298; 375/375

(56) References Cited

U.S. PATENT DOCUMENTS 4,928,277 A * 5/1990 Monma et al. ............. 347/246
5,357,353 A * 10/1994 Hirota ....................... 358/350
5,570,173 A * 10/1996 Nye et al. .................. 399/237
5,646,968 A * 7/1997 Kovacs et al. .............. 375/375

* cited by examiner

*Primary Examiner*—Hai C. Pham
(74) *Attorney, Agent, or Firm*—John M. Kelly; David E. Henn

(57) ABSTRACT

Raster scanners, and printing machines which use raster scanners, that include compensation for the finite response times of their lasers and their laser drive signals on image edges. When an image pixel is not an image edge the laser driver is driven in synchronization with a master clock. However, if an image pixel is an edge of an image the laser driver is driven earlier than it would have been if it was driven in synchronization with the master clock. Beneficially, the drive to the laser driver is advanced such that the actual laser exposure curve crosses that of an ideal laser exposure curve such that the developed line edge is substantially ideal.

8 Claims, 4 Drawing Sheets

EXPOSURE PROFILES FROM LASER SOURCES HAVING FINITE RESPONSE TIMES

FIELD OF THE INVENTION

This invention relates to electrophotographic marking systems that incorporate raster scanners having laser diode light sources. More specifically, it relates to such systems which compensate for the turn-on and turn-off times of their laser diode light sources.

BACKGROUND OF THE INVENTION

Electrophotographic marking is a well known method of copying or printing documents or other substrates. Electrophotographic marking is performed by projecting a light image representation of a desired final image onto a substantially uniformly charged photoreceptor. That light image then discharges the photoreceptor so as to create an electrostatic latent image of the desired image on the photoreceptor's surface. Toner particles are then deposited onto that latent image, forming a toner image on the photoreceptor's surface. That toner image is subsequently transferred, either directly or after an intermediate transfer step, and fused onto a marking substrate such as a sheet of paper, thereby forming the desired image. The surface of the photoreceptor is then cleaned of residual developing material and recharged in preparation for the creation of another image.

While many types of light exposure systems have been developed, a commonly used system is the raster output scanner (ROS). A raster output scanner is comprised of a laser beam source, a modulator for modulating the laser beam (which, as in the case of a laser diode, may be comprised of the source itself) such that the laser beam contains the desired image information, a rotating polygon having at least one reflective surface, input optics for collimating the laser beam, and output optics for focusing the laser beam into a spot on the photoreceptor and for correcting various optical problems such as wobble. The laser source, modulator, and input optics produce a collimated laser beam that is directed onto the reflecting surface or surfaces of the polygon. As the polygon rotates the reflective surface causes the laser beam to sweep along a scan plane. The swept laser beam passes through the output optics and is reflected by the mirror(s) so as to produce a spot which sweeps in a scan line across a charged photoreceptor. Since the charged photoreceptor moves in a direction which is substantially perpendicular to the direction of the sweeping spot, the sweeping spot raster scans the photoreceptor.

To assist the understanding of the present invention several things should be further described and highlighted. First, an electrophotographic printing machine may be required to image millions of individual spots on a given page. For example, a 300 spot per inch printer that images an area of 7.5 inches by 9 inches images an area containing more than 6 million spots. Considering that higher resolutions, such as 400, 600, 800 or 1200 spots per inch, are becoming common place, and considering that color printing requires that each image are be imaged 4 times (one for each of three primary colors plus black), a final print might be comprised of more than 100 million potentially imaged spots. Second, modern electrophotographic machines are frequently high volume machines in which the time available to print a desired image is severely limited. The foregoing implies that the time available to image each spot is very short.

After great effort and expense, manufacturers of electrophotographic printing machines have developed laser light sources and photoreceptor materials that generally meet the resolution and speed requirements of modem electrophotographic machines. However, as researchers attempt to improve the quality of the printed image still further, it has become apparent that improving the image quality of the leading and trailing edges of solid sections of an image area, such as the edges of a solid vertical line, is difficult. This is referred to herein as the edge placement problem.

One cause of the edge placement problem relates to the finite response times of laser diodes. Simply put, laser diodes take time to turn on when drive power is applied and they take time to turn off when drive power is removed. For example, after application of drive power to a laser diode it might take 1–5 ns for the laser diode to begin emitting light and another 0.1 to 10 ns for the laser intensity to reach its maximum. After drive power is removed it might take 0.5 to 15 ns for the laser diode to stop emitting light. Another cause of the edge placement problem is the finite response time of the laser diode drive signals. The overall effect of the laser diode and laser diode drive signal response times is a decrease in the accuracy of the edge placements.

Therefore, a technique of improving the edge placement by compensating for the finite response times of the laser diode and the laser diode drive signals would be beneficial.

SUMMARY OF THE INVENTION

The principles of the present invention provide for compensating for the finite response times of the laser diode and the laser diode drive signals. According to the principles of the present invention when an edge is being imaged the laser diode is turned on and off earlier than it normally would have been by advancing the occurrence of a controlling clock signal. Beneficially, the amount of advancement is such that an ideal instantaneous response time exposure curve crosses the actual laser response time curve at a place that preserves the placement of the developed line edge.

The principles of the present invention are beneficially implemented through incorporation of a data buffer, a processing capability that detects the starting edge and the ending edge of an image area, and a clock switch that advances the occurrence of a controlling clock signal over normal operation. When an image bit being produced is not a starting edge or an ending edge of an image area the image bit is produced in synchronization with a master clock single. When an image bit being produced is a starting edge or an ending edge the image bit is produced at an earlier time than it would have been if it was in synchronization with the master clock signal.

BRIEF DESCRIPTION OF THE DRAWINGS

Other aspects of the present invention will become apparent as the following description proceeds and upon to the drawings, in which.

DETAILED DESCRIPTION OF THE PREFERRED EMBODIMENTS

Figure 1:
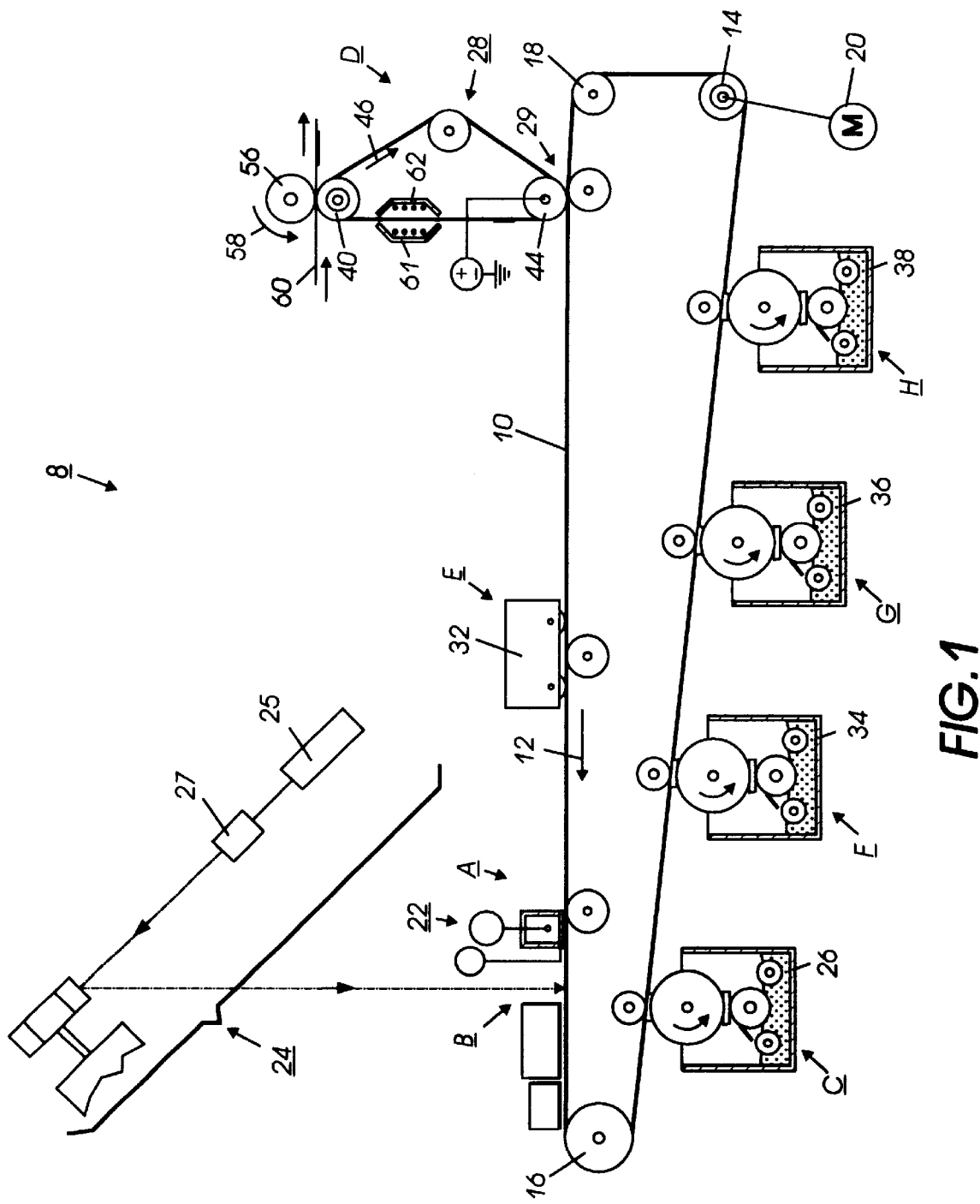
FIG. 1 schematically illustrates an electrophotographic printing machine which incorporates the principles of the present invention.

FIG. 1 illustrates an electrophotographic printing machine 8 that produces an original document. Although the principles of the present invention are well suited for use in such machines, they are also well suited for use in other devices, including copiers. Therefore it should be understood that the present invention is not limited to the particular embodiment illustrated in FIG. 1 or to the particular application shown therein.

The printing machine 8 includes a charge retentive device in the form of an Active Matrix (AMAT) photoreceptor 10 which has a photoconductive surface and which travels in the direction indicated by the arrow 12. Photoreceptor travel is brought about by mounting the photoreceptor about a drive roller 14 and two tension rollers, the rollers 16 and 18, and then rotating the drive roller 14 via a drive motor 20.

As the photoreceptor moves each part of it passes through each of the subsequently described processing stations. For convenience, a single section of the photoreceptor, referred to as the image area, is identified. The image area is that part of the photoreceptor which is operated on by the various stations to produce toner layers. While the photoreceptor may have numerous image areas, since each image area is processed in the same way a description of the processing of one image area suffices to explain the operation of the printing machine.

As the photoreceptor 10 moves, the image area passes through a charging station A. At charging station A a corona generating scorotron 22 charges the image area to a relatively high and substantially uniform potential, for example about −500 volts. While the image area is described as being negatively charged, it could be positively charged if the charge levels and polarities of the other relevant sections of the copier are appropriately changed. It is to be understood that power supplies are input to the scorotron 22 as required for the scorotron to perform its intended function.

Figure 2:
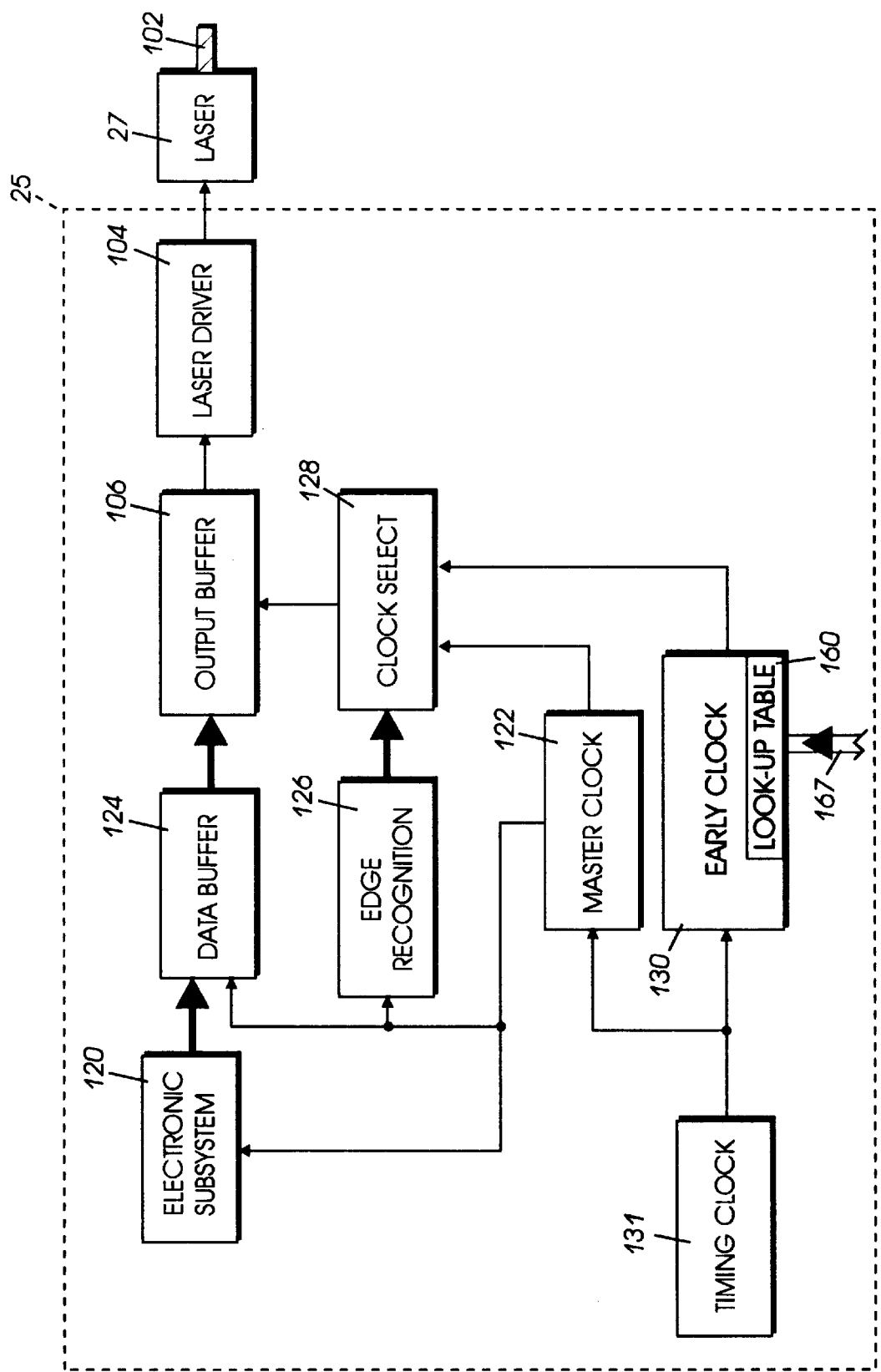
FIG. 2 schematically illustrates in block diagram form an electronic system that controls the emissions from the exposure station B of FIG. 1.

After passing through the charging station A the now charged image area passes to an exposure station B. At exposure station B the charged image area is exposed to the output of a laser based raster output scanning assembly 24 which illuminates the image area with a light representation of a first color image, say black. That light representation discharges some parts of the image area so as to create a first electrostatic latent image. The exposure station B includes an electronic system 25 that drives a laser diode 27. Since the principles of the present invention directly relate to the electronic system 25 and to the operation of the laser diode 27, those elements, which are schematically depicted in FIG. 2, are described in more detail subsequently.

After passing through the exposure station B, the now exposed image area passes through a first development station C. At the first development station C a negatively charged development material 26, which is comprised of black toner particles, is advanced onto the image area. The development material is attracted to the less negative sections of the image area and repelled by the more negative sections. The result is a first toner layer on the image area.

After passing through the first development station C the image area is advanced to a transfusing module D. That transfusing module includes a positively charged transfusing member 28, which may be a belt, as illustrated in FIG. 1, or a drum which forms a first nip 29 with the photoreceptor. That nip is characterized by a first pressure between the photoreceptor 10 and the transfusing member 28. The negatively charged toner layer on the photoreceptor is attracted onto the positively charged transfusing member.

After the first toner image is transferred to the transfusing member 28 the image area passes to a cleaning station E. The cleaning station E removes any residual development material remaining on the photoreceptor 10 using a cleaning brush contained in a housing 32.

After passing through the cleaning station E the image area repeats the charge-expose-develop-transfer-clean sequence for a second color of developer material (say yellow). Charging station A recharges the image area and exposure station B illuminates the recharged image area with a light representation of a second color image (yellow) to create a second electrostatic latent image. The image area then advances to a second development station F which deposits a second negatively charged development material 34, which is comprised of yellow toner particles, onto the image area so as to create a second toner layer. The image area and its second toner layer then advances to the transfusing module D where the second toner layer is transferred onto the transfusing member 28.

The image area is again cleaned by the cleaning station E. The charge-expose-develop-transfer-clean sequence is then repeated for a third color (say magenta) of development material 36 using development station G, and then for a fourth color 38 (cyan) of development material using development station H.

Turning our attention back to the transfusing module D, the transfusing member 28 is entrained between a transfuse roller 40 and a transfer roller 44. The transfuse roller is rotated by a motor, which is not shown, such that the transfusing member rotates in the direction 46 in synchronism with the motion of the photoreceptor 10. The synchronism is such that the various toner images are registered after they are transferred onto the transfusing member 28

Still referring to FIG. 1, the transfusing module D also includes a backup roller 56 which rotates in the direction 58. The backup roller is beneficially located opposite the transfuse roller 40. The backup roller cooperates with the transfuse roller to form a second nip which acts as a transfusing zone. When a substrate 60 passes through the transfusing zone the toner layer on the compression layer is heated by a combination of heat from a radiant preheater 61 or from conductive heat from a conductive heater 62 and heat from the transfuse roller 40. The combination of heat and pressure fuses the composite toner layer onto the substrate.

As mentioned above, the electronic system 25 and the laser diode 27 are shown in more detail in FIG. 2. It is to be understood that FIG. 2 shows a conceptual block diagram of the electronics that produce a laser beam 102 that exposes the photoreceptor 10. However, in some implementations the individual blocks shown in FIG. 2 and described subsequently may not actually exist as independent subsystems. Therefore, while FIG. 2 is useful for understanding the principles of the present invention, the present invention is to be limited only by the appended claims. As shown in FIG. 2, the raster output scanner 24 includes the laser diode 27 which emits the laser beam 102. The laser diode 27 is powered by a laser driver 104 that supplies a predetermined current to the laser diode when directed by digital signals from an output buffer 106.

The laser diode 27 and the laser driver 104 require finite periods of time, referred to as response times, to respond to the digital signals from the output buffer. Those response times differ, depending upon whether an element is turning on (a rise time) or off (a fall time). Furthermore, those digital signals themselves have finite rise and fall times. It should be noted that the various response times will vary as time, temperature, and bias voltages change. It also should be noted that the rise and fall times of any element are not usually the same. Without compensation, the finite response times degrade the accuracy of edge placements. To better understand this, consider the graphical representations shown in FIG. 3. The vertical axis represents the exposure of the photoreceptor, while the horizontal axis represents both time and distance. Exposure has two parts, the intensity of the light illuminating the photoreceptor and the time duration of that illumination. Using the same axis for both time and distance is acceptable since it will be assumed that the light spot travels at a constant velocity across the photoreceptor.

Figure 3:
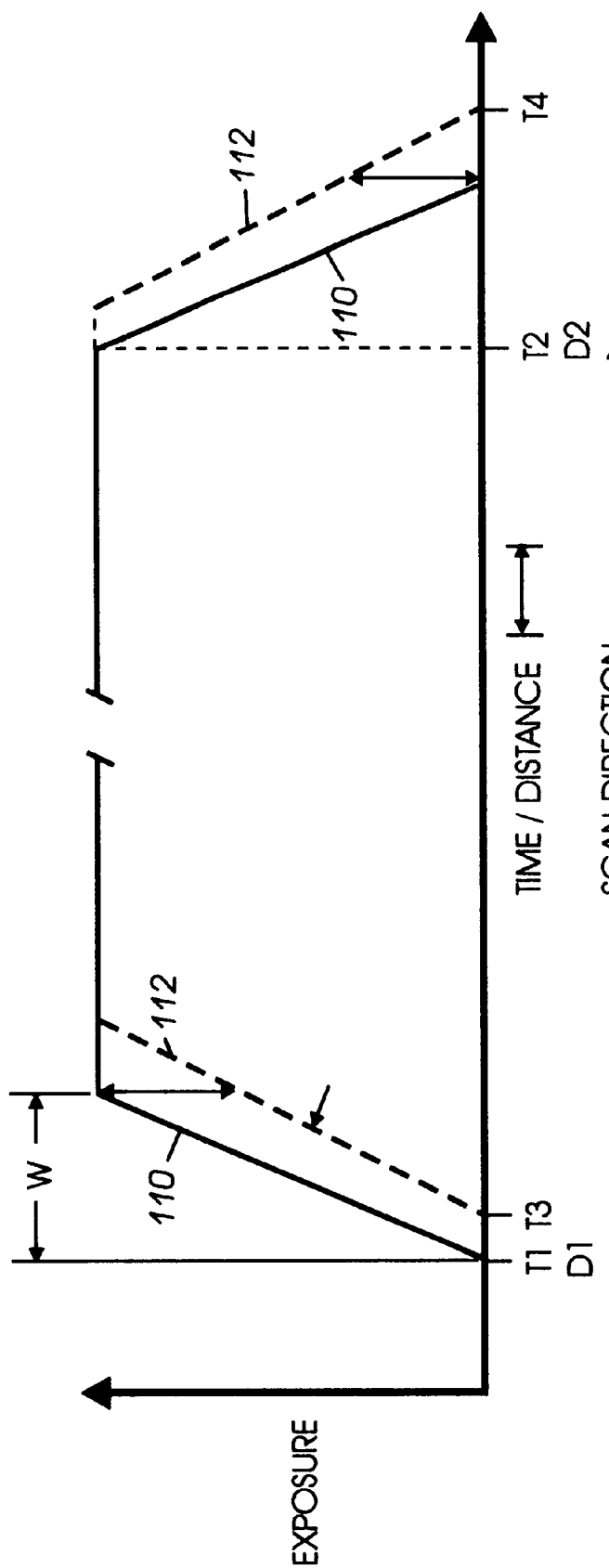
FIG. 3 illustrates the exposure profiles of a raster output scanner having an ideal laser diode, that is laser diode with instantaneous turn-on and turn-off times, and of a prior art raster output scanner.

Still referring to FIG. 3, at time T1 (distance D1) it is assumed that an ideal step digital signal is output from the output buffer 106. Trace 110 is a graph of the exposure verses time/distance profile of an ideal laser driver and an ideal laser diode, one that emits a laser spot having a rectangular intensity profile with a width of W (in practice, laser beams tend to have gaussian intensity profiles). By ideal it is meant that there are no time delays. At time T1 it will be assumed that the trailing edge of the laser spot is at D1. As shown, the exposure profile of the idealized system begins to rise immediately, reaching a maximum after a time that corresponds to the width of the laser spot. That maximum exposure is retained until a time T2 (distance D2) when the ideal step digital signal from the output buffer ends. At that time the exposure profile immediately begins dropping, eventually reaching zero in a time/distance that again corresponds to the width of the laser spot.

Still referring to FIG. 3, trace 112 represents the exposure verses time/distance profile of an exemplary prior art raster output scanner system in which the digital signal output from the output buffer 106 has finite rise and fall times, the laser diode driver has finite response and rise and fall times, and the laser diode driver has finite response and rise and fall times. However, it is still assumed that the laser spot has a rectangular intensity profile with a width W and that the signal from the output buffer begins at time T1. As shown, instead of the exposure beginning at time T1, the exposure, as shown by trace 112, actually begins at time T3. The delay being caused by the time required for the laser driver 104 to react to the signal from the output buffer and the time required for the laser diode to begin emitting light. Also as shown, the trace 112 does not rise as fast as the trace 110. This is caused by the delay of the laser diode to begin emitting full output power. Finally, assuming that the signal from the output buffer begins turning off at time T2, the exposure profile would not reach zero until a time T4. This delay is caused by the finite fall times of the signal from the output buffer, the finite reaction times of the laser driver, and the finite time required for the laser 27 to stop emitting light.

Figure 4:
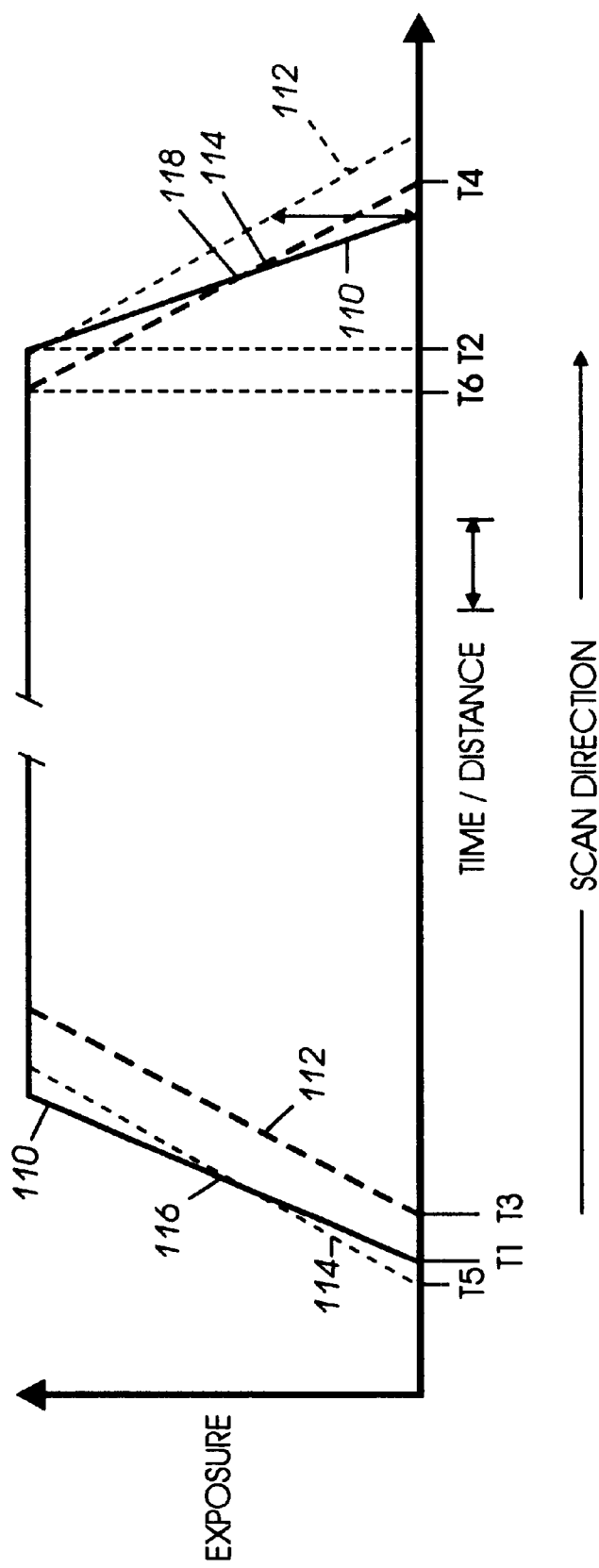
FIG. 4 illustrates the exposure profiles of FIG. 3, plus the exposure profile from exposure station B.

The principles of the present invention compensate for the finite response times of the various signals and systems by advancing the turn on and turn off times of the signals from the output buffer 106 when a pixel being written is an edge of an image area. FIG. 4 conceptually illustrates how this improves the performance of the Exposure system B. Assume that the same raster output scanner that produced trace 112 is used, but now the signal from the output buffer is advanced from time T1 to time T5, which precedes time T1 by a predetermined amount. The resulting exposure verses time/distance profile is shown as trace 114. As shown, trace 114 crosses the trace 110 at a point 116. Furthermore, by setting the advancement of T5 over T1 the crossover point 116 can be set anywhere on the rising edge of the trace 110. Further assume that the turn-off time of the signal from the output buffer begins at a time T6 that precedes time T2. As shown, trace 114 crosses the trace 110 at a point 118. By adjusting the advancement of T6 over T2 the crossover point 118 can be set anywhere on the falling edge of the trace 110.

Still referring to FIG. 4, the trace 114 matches the trace 110 better than the trace 112 does since the error between the traces is smaller. Furthermore, by setting the crossover points 116 and 118 according to the characteristics of the developer and/or the photoreceptor the developed image can be set very close to that which would result if an ideal raster output scanner was used. This is because in practical electrophotographic systems the exposure profile verses developed toner mass is not linear. A minimum exposure is needed to produce a developed spot. If the exposure is below this minimum the exposed spot is not developed. Furthermore, high exposures tend to saturate: if the exposure increases substantially little or no additional toner is developed. By choosing the crossover points 116 and 118 good edges can be developed.

Referring once again to FIG. 2, the digital signals which are eventually output from the output buffer 106 are derived, in a manner that is described shortly, from an electronic subsystem 120. That subsystem may include permanent or temporary memories, a central processing unit, an input scanner, a facsimile device, and/or some other source of image data. That data is clocked out of the electronic subsystem in synchronization with a master clock signal from a master clock 122. In prior art systems the data from the electronic subsystem would be applied directly to the output buffer 106. However, in the electrophotographic printer 8, to assist in identifying image edges the data out of the electronic subsystem is first clocked in synchronization with the master clock signal into a data buffer 124 for temporary storage. An edge recognition system 126 examines the data in the data buffer to locate the image edges. For example, in a very simple system the image edges might be determined by sensing the first and last HIGHs in a string of HIGHs. The edge recognition system 126 outputs a logic signal to a clock select network 128: when that logic signal is in one state the data clocked out of the data buffer is not an image edge, when that logic signal is in the other state the data clocked out of the data buffer is an image edge.

The clock select network 128 also receives both the master clock signal from the master clock 122 and an early clock signal from an early clock 130. Both the master clock signal and the early clock signal are beneficially derived from a timing clock 131. The early clock signal has the same frequency as the master clock, but its active edge begins slightly earlier than the master clock active edge. Based upon the logic level from the edge recognition system 126, the clock select network 128 applies either the master clock to the output buffer or the early clock to the output buffer. The master clock is applied when the data bit applied to the output buffer is not an edge of an image, the early clock is applied when the data bit applied to the output buffer is an image edge.

While the early clock signal might occur a fixed period of time before the master clock signal, in practice it is better to select the period of time at which the early clock signal proceeds the master clock signal using a look-up table. For example, FIG. 2 shows the early clock 130 having a look-up table 160 which receives data on a bus 167. Such a look up table might respond to data inputs related to the aging of the laser diode and driver, the D.C. bias levels, and the diode temperature. Then, depending upon the states of its inputs, the look-up table could select a suitable period of time by which the early clock signal proceeds the master clock.

The foregoing describes an embodiment of the principles of the present invention. However, others who are skilled in the applicable arts will recognize numerous modifications and adaptations of the illustrated embodiment that are also in accord with the principles of the present invention. For example, separate clocks do not have to be used, a single clock and a switchable delay can also be used. Furthermore, various functions of the illustrated embodiment can be combined into one subsystem and additional functions, such as laser output power intensity control can be added. Therefore, it is to be understood that the present invention is to be limited only by the appended claims.

What is claimed:

1. A raster scanner assembly comprised of:
   a master clock for generating master clock signals having active edges;
   an electronic subsystem for producing image data bits that represent a composite image that has both standard image areas and image edges, said electronic subsystem for transmitting said image data bits in substantial synchronization with said active edges;
   a laser assembly for generating a laser beam in accord with drive signals;
   an edge sensor, operatively connected to said electronic subsystem, for sensing said image edges;
   a laser driver producing said drive signals from said image data bits, wherein said drive signals are produced synchronously with said active edges when an image data bit represents a standard image area, and wherein said drive signals are produced earlier than said active edges when an image data bit represents an image edge; and
   a rotating polygon having a plurality of facets for receiving said generated laser beam from said laser assembly, said rotating polygon for sweeping said generated laser beam in a sweep plane.

2. The raster scanner assembly according to claim 1, further including a data buffer operatively connected to said edge sensor, said data buffer for temporarily storing a plurality of image data bits.

3. A raster scanner assembly comprised of:
   a master clock for generating master clock signals having active edges;
   an early signal clock for generating early clock signals that have active edges that occur a predetermined period of time before the active edges of said master clock signals;
   an electronic subsystem for producing image data bits that represent a composite image that has both standard image areas and image edges, said electronic subsystem for transmitting said image data bits in substantial synchronization with said master clock signal active edges;
   a laser assembly for generating a laser beam in accord with drive signals;
   an edge sensor, operatively connected to said electronic subsystem, for sensing said image edges;
   a laser driver producing said drive signals from said image data bits, wherein said drive signals are produced synchronously with said master clock signal active edges when an image data bit represents a standard image area, and wherein said drive signals are produced synchronously with said early clock signal active edges when an image data bit represents an image edge; and
   a rotating polygon having a plurality of facets for receiving said generated laser beam from said laser assembly, said rotating polygon for sweeping said generated laser beam in a sweep plane.

4. The raster scanner assembly according to claim 3, further including a data buffer operatively connected to said edge sensor, said data buffer for temporarily storing a plurality of image data bits.

5. The raster scanner assembly according to claim 3, further including a look-up table operatively connected to said early signal clock, said look-up table for selecting said predetermined period of time.

6. A marking machine comprised of:
   a photoreceptor having a charged surface;
   a raster output scanner for illuminating said photoreceptor such that a latent image is produced on said photoreceptor, said raster output scanner comprising:
      a master clock generating a master clock signal having active edges;
      an electronic subsystem for producing image data bits that represent a composite image that has both standard image areas and image edges, said electronic subsystem for transmitting said image data bits in substantial synchronization with said active edges;
      a laser assembly for generating a laser beam in accord with drive signals;
      an edge sensor, operatively connected to said electronic subsystem, for sensing said image edges;
      a laser driver producing said drive signals from said image data bits, wherein said drive signals are produced synchronously with said active edges when an image data bit represents a standard image area, and wherein said drive signals are produced earlier than said active edges when an image data bit represents an image edge; and
      a rotating polygon having a plurality of facets for receiving said generated laser beam from said laser assembly, said rotating polygon for sweeping said generated laser beam in a sweep plane;
   a developing station for depositing a toner layer on said latent image;
   a transfer station for transferring said toner layer onto a substrate; and
   a fuser for fusing said toner layer to said substrate.

7. The raster scanner assembly according to claim 6, further including a data buffer operatively connected to said edge sensor.

8. A method of illuminating a photoreceptor comprised of the steps of:
   generating a sequence of timing signal;
   producing a sequence of image data bits that represent a composite image comprised of standard image areas and image edges;
   sensing the image data bits that represent image edges; and
   producing laser light in according with the sequence of image data bits, wherein the laser light is produced in synchronization with the timing signals when an image data bit represents a standard image area, and wherein the laser light is produced earlier when an image data bit represents an image edge.

* * * * *